(12) United States Patent
Levin et al.

(10) Patent No.: US 8,893,204 B2
(45) Date of Patent: Nov. 18, 2014

(54) DYNAMICALLY ADAPTING MEDIA STREAMS

(75) Inventors: Danny Levin, Redmond, WA (US); Tim M Moore, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1833 days.

(21) Appl. No.: 11/771,867

(22) Filed: Jun. 29, 2007

(65) Prior Publication Data

US 2009/0003436 A1 Jan. 1, 2009

(51) Int. Cl.
*H04N 21/2343* (2011.01)
*H04N 21/2662* (2011.01)
*H04N 21/258* (2011.01)
*H04N 21/262* (2011.01)

(52) U.S. Cl.
CPC . *H04N 21/234309* (2013.01); *H04N 21/26208* (2013.01); *H04N 21/2662* (2013.01); *H04N 21/25808* (2013.01)
USPC ...... 725/114; 370/465; 348/14.09; 348/14.12

(58) Field of Classification Search
USPC ............................ 725/114; 348/14.08–14.15; 370/465–473
See application file for complete search history.

(56) References Cited

U.S. PATENT DOCUMENTS

| | | | |
|---|---|---|---|
| 6,490,320 B1 | 12/2002 | Vetro et al. | |
| 6,563,517 B1 | 5/2003 | Bhagwat et al. | |
| 6,731,734 B1 * | 5/2004 | Shaffer et al. | 379/202.01 |
| 6,888,477 B2 | 5/2005 | Lai et al. | |
| 6,989,856 B2 | 1/2006 | Firestone et al. | |
| 7,170,933 B2 | 1/2007 | Kouloheris et al. | |
| 7,180,858 B1 * | 2/2007 | Roy et al. | 370/232 |
| 2005/0276284 A1 | 12/2005 | Krause et al. | |
| 2006/0126742 A1 | 6/2006 | Soferman et al. | |
| 2006/0174015 A1 * | 8/2006 | Arauz-Rosado | 709/228 |
| 2006/0198392 A1 * | 9/2006 | Park et al. | 370/468 |
| 2007/0002865 A1 | 1/2007 | Burks et al. | |

FOREIGN PATENT DOCUMENTS

WO WO2006066632 A1 6/2006

OTHER PUBLICATIONS

Searles, Michael. "Probe Based Dynamic Server Selection for Multimedia Quality of Service." 2004.*
Kassler, et al., "Generic Qos Aware Media Stream Transcoding and Adaptation", available at least as early as Feb. 23, 2007, at <<http://www-vs.informatik.uni-ulm.de:81/projekte/AKOM/Generic_QoS.pdf>, pp. 1-10.
Shan, et al., "Joint Source-Network Error Control Coding for Scalable Overlay Video Streaming", available at least as early as Feb. 23, 2007, at <<http://www.cipr.rpi.edu/research/publications/Woods/Shan_ICIP_2005.pdf>>, pp. 1-4.
Toufik, et al., "Delivering Audiovisual Content with MPEG-21-Enabled Cross-Layer QoS Adaptation", available at least as early as Feb. 23, 2007, at <<http://www.zju.edu.cn/jzus/2006/A0605/A060514.pdf>>, pp. 1-10.

* cited by examiner

*Primary Examiner* — Bennett Ingvoldstad
(74) *Attorney, Agent, or Firm* — Andrew J. R. Smith; Jim Ross; Micky Minhas

(57) ABSTRACT

Tools and techniques for dynamically transcoding media streams are described herein. These tools may provide machine-readable storage media that contain machine-readable instructions that, when executed by the machine, cause the machine to define initial transcoding schemes under which media streams are to be transcoded as they passes between endpoints. In response to changes in conditions affecting the media streams, the machine may dynamically update the initial transcoding scheme.

20 Claims, 7 Drawing Sheets

DYNAMICALLY ADAPTING MEDIA STREAMS

BACKGROUND

Media streaming applications continue to proliferate in the industry. Various utilities, known as codecs, for encoding and/or decoding these streams, are available. These different codecs may offer particular attributes or features that make them suitable or appropriate for use in different streaming applications.

Two or more endpoints may participate in streaming media to one another, or from one to the other. However, in some instances, the endpoints may not be directly compatible with one another, such that the endpoints cannot stream media from one to the other without some type of translation. In cases where the endpoints do not, for example, share a common encoding scheme, these media streams may pass through a mediation server, which transcodes the streams from a scheme supported by an origin endpoint to a scheme supported by a destination endpoint.

Typical conventional approaches define a transcoding scheme between the incompatible endpoints when the streaming session is established. However, conditions may change during the streaming session, in which case the transcoding scheme defined initially may not be optimal under the changed conditions.

SUMMARY

Tools and techniques for dynamically adapting media streams are described herein. These tools may provide machine-readable storage media that contain machine-readable instructions that, when executed by the machine, cause the machine to define initial transcoding schemes under which media streams are to be transcoded as they passes between endpoints. In response to changes in conditions affecting the media streams, the machine may dynamically update the initial transcoding scheme.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTIONS OF THE DRAWINGS

Tools related to dynamically adapting media streams are described in connection with the following drawing figures. The same numbers are used throughout the disclosure and figures to reference like components and features. The first digit in a reference number indicates the drawing figure in which that reference number is introduced.

DETAILED DESCRIPTION

Overview

The following document describes tools capable of performing and/or supporting many techniques and processes. The following discussion describes exemplary ways in which the tools provide for dynamically adapting media streams. This discussion also describes other techniques and/or processes that the tools may perform. For example, the description and drawings provides a discussion of altering or adapting transcoding schemes in response to changing conditions affecting the transmission of media streams. However, the tools described herein may be extended beyond transcoding, and may apply to other types of media filters, such as relays, encryption, or the like.

Figure 1:
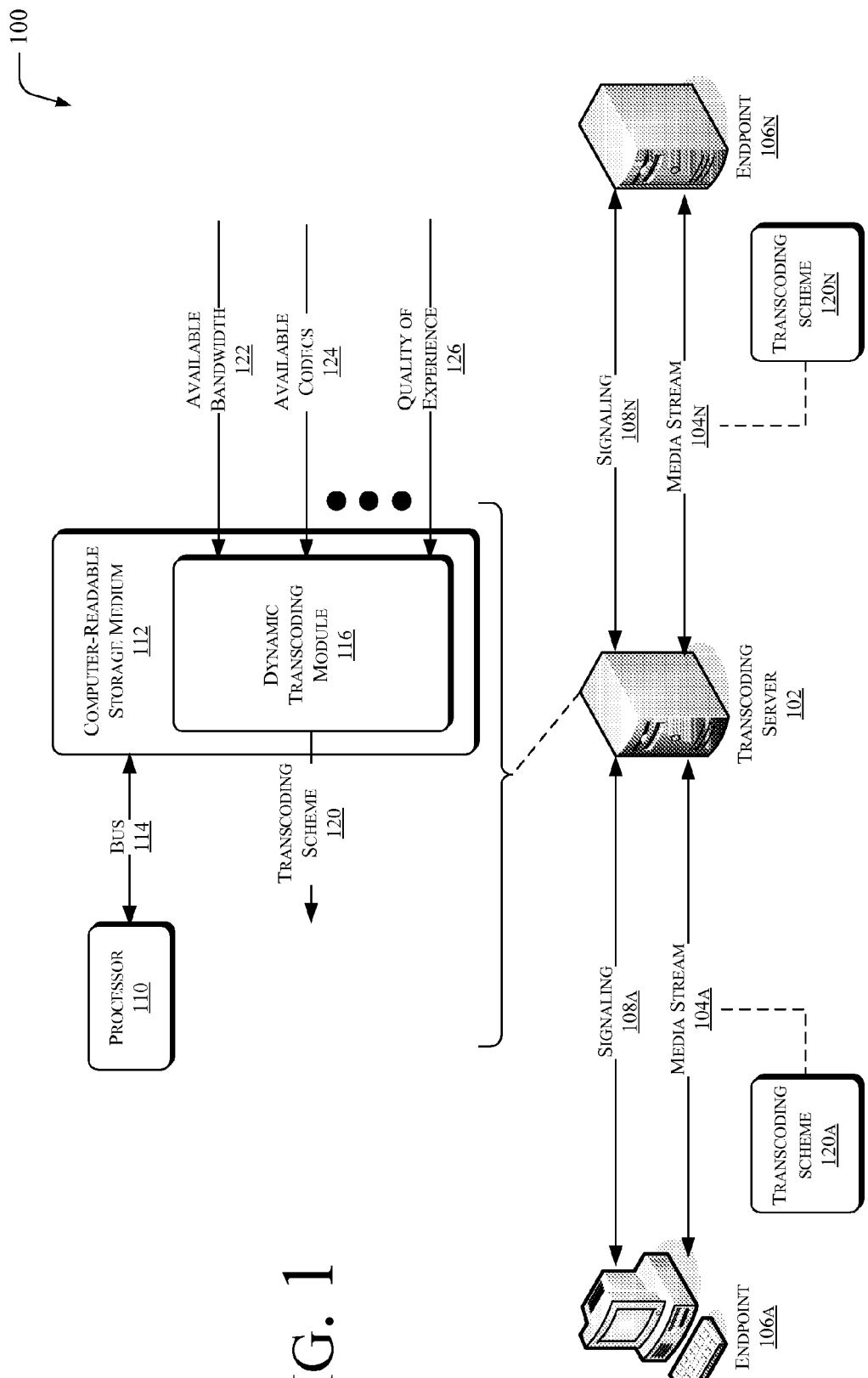
FIG. 1 is a block diagram of systems and/or operating environments for dynamically transcoding media streams.

FIG. 1 illustrates systems and/or operating environments 100 for dynamically transcoding media streams. The systems 100 may include a transcoding server 102 that provides a platform supporting the transmission of media streams 104a and 104n (collectively, media streams 104) between respective end points 106a and 106n (collectively, end points 106). The media streams 104 as shown in FIG. 1 may represent audio streams, video streams, data streams, or other types of streams. These media streams may also represent any convenient combination thereof.

The media streams may pass between the end points 106 through one or more intermediate networks. However, to promote clarity and facilitate description, FIG. 1 does not illustrate these networks.

The transcoding server 102 may also handle any signaling related to transmitting the media streams 104 between the endpoints 106. Examples of the endpoints may include stationary personal computing devices or workstations, mobile or portable laptop or notebook devices, wireless communications devices or personal digital assistants (PDAs), servers, gateways between packet-switched networks (e.g., voice over IP, or VoIP networks) and circuit-switched networks (e.g., a public-switched telephone network, or PSTN).

FIG. 1 denotes example signal flows at respectively at 108a and 108n (collectively, signal flows 108). These signal flows 108 control or specify how the media streams are transmitted between the endpoints 106, and may comply with suitable protocols, such as the session initiated protocol (SIP). In addition, commands related to media control (e.g., changing media attributes) may be signaled via Session Description Protocol (SDP). The SDP signaling may be tunneled via SIP as defined in RFC 3264.

Turning to the transcoding server 102 in more detail, this server may be a computer-based system that includes one or more processors, denoted at 110. These processors may also be categorized or characterized as having a given type or architecture, but may or may not have the same type or architecture.

The transcoding server may also include one or more instances of machine-readable or computer-readable storage media, denoted generally at 112. The processor 110 may communicate with the computer-readable media 112, and other components or sub-systems of the transcoding server, via one or more busses 114. These busses 114 may be of any suitable width, and may comply with any convenient bus architecture.

The computer-readable media 112 may contain instructions that, when executed by the processor 110, perform any of the tools or related functions that are described herein as being performed by the transcoding server. The processor may access and/or execute the instructions embedded or encoded onto the computer-readable media, and/or may access data stored in the computer-readable media. Additionally, it is noted that the computer-readable storage media, and any software stored thereon, may reside on hardware other than a conferencing server without departing from the scope and spirit of the description herein. The examples shown in FIG. 1 are provided only to facilitate discussion, but not to limit possible implementations.

Turning in more detail to the computer-readable media 112, it may include one or more instances of a dynamic transcoding module 116. The dynamic transcoding module 116 may include a collection of software instructions that, when loaded into the processor 110 and executed, may establish a communication session between the endpoints. Once the dynamic transcoding module establishes sessions, one or more of the endpoints may begin transmitting the media streams via these sessions.

As at least part of establishing the communication session, the dynamic transcoding module may establish one or more transcoding schemes applicable to the communication sessions. FIG. 1 provides an example of a transcoding scheme at 120, and illustrates a transcoding scheme 120*a* related to the media stream 104*a*, and a transcoding scheme 120*n* related to the media stream 104*n*.

The transcoding schemes may specify which codecs (coder-decoder programs or encoding schemes) to use in transmitting given media streams. However, for a variety of reasons, two or more of the endpoints may be incompatible with one another. For example only, in some instances, two or more of the endpoints may not share a common encoding scheme. For example, one of the endpoints might support codecs A, B, and C, while another endpoint might support codecs X, Y, and Z, such that no codec is common between the endpoints.

In other instances, different codecs may function optimally with different levels of bandwidth, as available from the networks over which the endpoints transmit the media streams. Thus, even if the endpoints support one or more codecs in common, available network bandwidth may not permit the transcoding server to select these common codecs.

The transcoding scheme selected by the dynamic transcoding module may resolve or overcome any incompatibilities existing between two or more of the endpoints. In this manner, the dynamic transcoding module may achieve some level of interoperability between the endpoints. For example, without limiting possible implementations of the description herein, assume that the transcoding scheme 120*a* indicates that the media stream 104*a* is to be encoded using a first codec, and that the transcoding scheme 120*n* indicates that the media stream 104*n* is to be encoded using a second codec that is different than the first codec. When packets forming part of the media stream 104*a* media arrive at the transcoding server, the server may decode these packets using the first codec, re-encode these packets using the second codec, and then transmit these re-encoded packets as part of the media stream 104*n*.

To establish the transcoding scheme 120, the dynamic transcoding module may receive and analyze one or more input parameters. FIG. 1 shows several non-limiting examples of such parameters. The line 122 represents data indicating bandwidth available from one or more networks over which the transcoding server may transmit the media streams 104. The line 124 represents data indicating which codec(s) are supported by respective endpoints 106. The line 126 represents a quality of experience (QoE) parameter, which approximates how well the media streams 104 are perceived by human users accessing the media streams. It is noted that implementations of the dynamic transcoding module may analyze other input parameters; the examples shown in FIG. 1 are provided only for ease of description.

In some instances, when the transcoding server is initially establishing the transcoding scheme, the server may not have access to precisely fixed values of some of the input parameters. For example, at the outset, the available network bandwidth (e.g., 122) may not be known precisely, and may not be measured until the server has processed the media streams for some period of time. Similarly, the codecs chosen as part of an initial transcoding scheme may prove to be less effective than expected. Initially, the transcoding server may resort to a "best guess" approach when defining the transcoding scheme.

These factors, and possibly others, may lead to a reduced QoE level, although this may not be apparent when establishing the transcoding scheme. However, as the media streams pass through the transcoding server for some period of time, the transcoding server may re-sample one or more of these input parameters, and may update the transcoding scheme as more accurate data regarding the condition of the media streams becomes available. The transcoding server may repeat this optimization process as many times as appropriate. In this manner, the transcoding server (more specifically, the dynamic transcoding module) may dynamically manage the transcoding scheme to achieve optimum results over the duration of the media streams 104.

Figure 2:
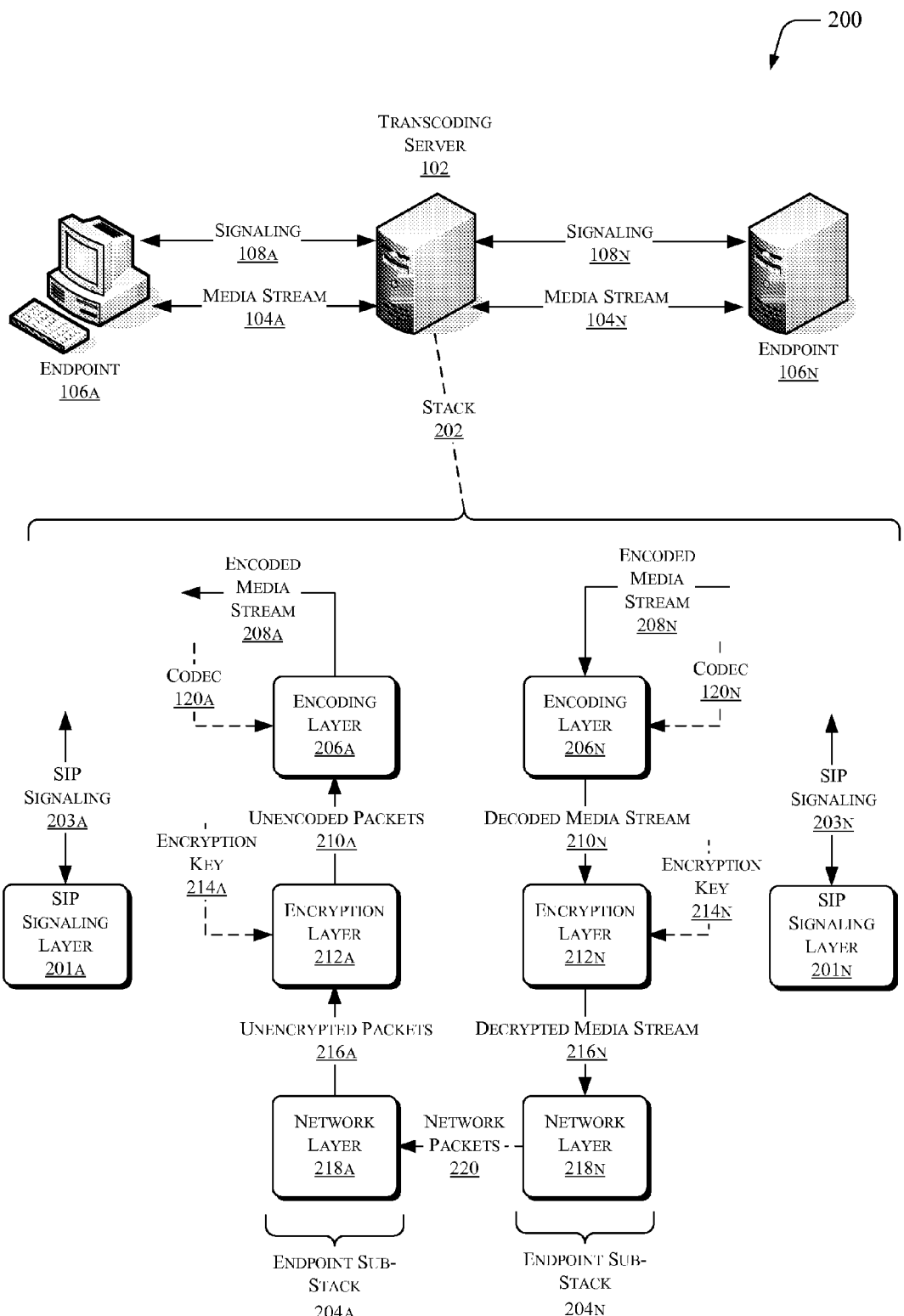
FIG. 2 is a block diagram of stack structures by which a transcoding server may transcode media streams dynamically.

Having described the systems for dynamically transcoding media streams in FIG. 1, the discussion now turns to a description of stack structures by which the transcoding server may transcode media streams dynamically, now presented with FIG. 2.

FIG. 2 illustrates stack structures, denoted generally at 200, by which the transcoding server may transcode media streams dynamically. For convenience of description, but not to limit possible implementations, FIG. 2 may carry forward some items described previously, and may denote them by similar reference signs.

The transcoding server 102, as carried forward into FIG. 2, may construct a stack structure 202, which may include respective sub-structures or sub-stacks for different endpoints. The stack structure may include stack components for handling media, and signaling layer components for handling signaling and messaging (e.g., SIP-compliant). The transcoding server may store this stack structure in a suitable computer-readable medium (e.g., 112).

FIG. 2 illustrates sub-stacks 204*a* and 204*n* (collectively, sub-stacks 204), with the sub-stack 204*a* corresponding to the endpoint 106*a*, and the sub-stack 204*n* corresponding to the endpoint 106*n*. The sub-stack components may process media passed between the endpoints 106*a* and 106*n*.

FIG. 2 also illustrates signaling layer components 201a and 201n (collectively, signaling layer components 201), which operate in parallel with the sub-stack components to facilitate exchange of media between the endpoints 106 through the server 102. More specifically, the signaling layer components 201a may process signal flows between the endpoint 106a and the server 102, denoted generally at 203a. Similarly, the signaling layer components 201n may process signal flows between the endpoint 106n and the server 102, denoted generally at 203n. FIG. 2 illustrates a non-limiting example of SIP-compliant signaling.

Turning to the sub-stacks 204 in more detail, the sub-stacks may include instances of encoding layer components, with FIG. 2 providing examples of encoding layer components 206a and 206n, associated respectively with the sub-stack 204a and 204n. For the purposes of describing the stack 202 herein, but without limiting possible implementations, this discussion provides an example in which a media stream 208a arrives from the endpoint 106n, is processed through the stack 202, and emerges from the stack as media stream 208a for transmission to the endpoint 106a.

Turning to the stream 208n in more detail, the endpoint 106n may encode the input media stream 208n using a codec specified by the transcoding scheme applicable to that endpoint 106n (e.g., 120n carried forward from FIG. 1). Assuming that the endpoint 106n uses a different codec than the endpoint 106a, the encoding layer component 206n may use the codec 120n to decode the packets of the input media stream 208n. FIG. 2 denotes the output of the encoding layer component 206n as a decoded media stream 210n.

The stack 202 may also include encryption layer components, with FIG. 2 providing examples of encryption layer components 212a and 212n, associated respectively with the sub-stacks 204a and 204n. The encryption layer components may operate with respective encryption keys negotiated by the transcoding server for use by two or more of the endpoints 106. FIG. 2 denotes examples of the encryption keys at 214a and 214n, corresponding respectively to the sub-stacks 204a and 204n.

Continuing the above example, the encryption layer component 212n may receive the decoded media stream 210n, decrypt it using the key 214n, and produce a decrypted media stream 216n as output. The decrypted media stream 216n may take the form of, for example, network packets suitable for transmission across a network free of any encoding or encryption.

The stack 202 may also include network layer components 218a and 218n (collectively, network layer components 218). The network layer component 218a corresponds to the endpoint 106a and the network layer component 218n corresponds to the endpoint 106n. These network layer components handle the details of passing packets (e.g., 220) between the endpoints.

Continuing the above example, the network layer component 218n may receive the decrypted media stream 216n, and pass this stream to the network layer component 218a as packets 220. In turn, the network layer component 218a may receive the packets 220, and forward them to the encryption layer component 212a as unencrypted packets 216a. The encryption layer component 212a may encrypt using the key 214a, resulting in encrypted (but un-encoded) packets 210a. The encoding layer 206a may then encode the packets 210a using the codec 120a for the endpoint 106a, resulting in the encoded media stream 208a suitable for transmission to the endpoint 106a.

Figure 3:
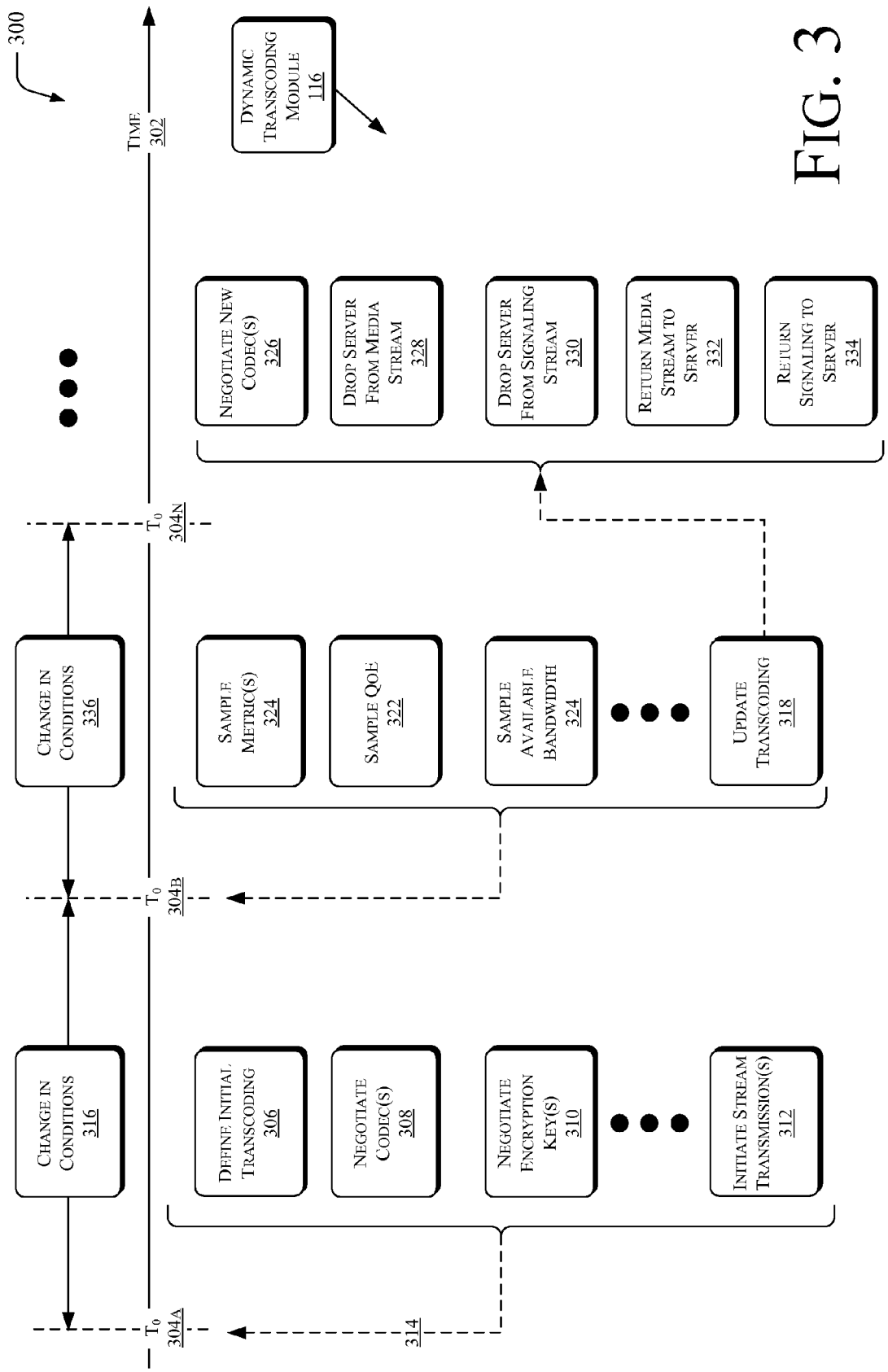
FIG. 3 is a flow diagram of processes for dynamically transcoding media streams as the streams are transmitted over time.

Having described the stack structures by which a transcoding server may transcode media streams dynamically in FIG. 2, the discussion now turns to a description of processes for dynamically transcoding media streams as the streams are transmitted over time, now presented with FIG. 3.

FIG. 3 illustrating processes, denoted generally at 300, for dynamically transcoding media streams as the streams are transmitted over time. For convenience of description, but not to limit possible implementations, some items described previously may be carried forward into FIG. 3 and denoted by similar reference signs. Additionally, for ease of reference only, the processes 300 are described in connection with the dynamic transcoding module 116. However, it is noted that implementations of the processes 300 may be executed on components or systems other than the module 116 without departing from the scope and spirit of the description herein.

FIG. 3 provides a time line or axis 302, with arbitrary instances of time shown at the points 304a, 304b, and 304n along this axis. For ease of reference, FIG. 3 labels these points as times $T_0$, $T_1$, and $T_N$. However, these instances of time are provided only for the purposes of this description, and do not limit possible implementations of the processes 300.

At an initial time 304a, the processes may establish an initial transcoding scheme (e.g., 120 in FIG. 1). The transcoding server may begin transmitting and processing the media streams (e.g., 104) under this initial transcoding scheme, as represented generally at block 306.

Block 306 may include one or more sub-processes performed as part of defining or establishing the initial transcoding scheme. For example, block 308 represents negotiating any codecs for use by one or more of the endpoints involved in transmitting the media streams. Block 308 may include determining which codecs are supported by different endpoints, analyzing any bandwidth considerations relating to these different codecs, and selecting the codec(s) for use with different endpoints.

Where appropriate under the circumstances, block 308 may be biased toward sharing as few codecs as possible across the endpoints, thereby reducing the number of decode-encode operations performed to "translate" or transcode between different codecs. Block 308 may include estimating bandwidth available for communicating with various endpoints, and factoring those estimates into selecting codecs as part of the transcoding scheme.

Block 310 represents negotiating any encryption keys to be used in encrypting packets transmitted to or from a given endpoint. Block 310 may include defining a respective key for each endpoint sending or receiving media streams.

Block 312 represents initiating the transmission and processing of the media streams between two or more endpoints. Block 312 may include transmitting the media streams according to the initial transcoding scheme established in block 306.

The blocks 306-312 as shown in FIG. 3 may be performed in any suitable order as appropriate in different implementations. Generally, the processes 300 may perform one or more of the blocks 306-312 approximately at the time 304a, when initiating the media streams, as indicated by the dashed line 314.

At any point between the time 304a and a subsequent time 304b, the conditions under which the media streams occur may change, as denoted generally at block 316. In some instances, parameters whose values were unclear at the time 304a were estimated or approximated. However, by the time 304b, values for those parameters may have become more clearly fixed. For any of the foregoing reasons, or other reasons as well, the processes 300 may include updating the transcoding scheme in response to any conditions that have changed, that have clarified, or the like, as represented generally at 318.

Block 318 may include sampling one or more metrics related to the media streams, as indicated at block 320. For example, block 322 represents sampling one or more values of quality of experience (QoE) parameters, which indicate how well any human users associated with various endpoints are able to perceive and understand content conveyed by the media streams. Block 324 represents determining how much bandwidth is actually available to communicate with the various endpoints.

The processes 300 may measure and compile these QoE and available bandwidth parameters over the interval from the times 304a to 304b, as the media streams were transmitted over that interval. The experience gained over that interval in handling the media streams may enable the processes 300 to update or optimize the transcoding used for different endpoints, as shown in block 318.

Turning to the updating block 318 in more detail, FIG. 3 illustrates several non-limiting examples of how the transcoding may be optimized or updated as time progresses along the axis 302. For example, block 326 represents negotiating new codecs with one or more of the endpoints. In some instances, the actual bandwidth available to different endpoints, as revealed by block 324, may justify changing to higher or lower bandwidth codecs. In other instances, the codec chosen at the time 304a may not result in optimum QoE for a variety of reasons. In still other instances, some endpoints may drop from the media streams, while other endpoints may join the media streams. Thus, block 326 may include re-negotiating codecs for any of the foregoing reasons, or others.

Block 328 represents dropping the transcoding server from handling the media streams 104. For example, assuming two endpoints 104a and 104n (FIG. 1) support the same codec, and assuming this codec is optimal under the prevailing network and QoE conditions, then these two endpoints may both use the same codec. Because these two endpoints are using the same codec, the transcoding server may no longer translate or transcode between different codecs, and any media streams 104 that use this common codec may be moved off of the server. This optimization may free resources on the server.

Block 330 represents dropping the server from handling signaling between two or more endpoints. FIG. 1 provides examples of signaling at 108, as described above. In some instances, the processes 300 may remove the media streams from the server, while maintaining the signaling on the server. Generally, transcoding the media streams consumes more of the server's resources, as compared to handling signaling related to the streams. In other instances, the processes may remove both the signaling and the media streams from the server.

Block 332 represents returning the media stream to the server. Assume, for example, that the media stream was previously removed from the server (e.g., block 328) because increased bandwidth justified the use of a common codec between endpoints. If bandwidth to one endpoint decreases sometime later, the common codec may not perform as well across both endpoints. In such a case, the one end point might operate better with a different codec, such that the server would then transcode the media streams passing between the endpoints. If the media streams were removed from the server previously because it was no longer transcoding, then block 332 may include bringing the server back into the media stream to resume transcoding.

Block 334 represents returning signal processing to the transcoding server, in instances where block 330 dropped the server from processing the signals. For example, block 334 may include keeping the SIP processing on the transcoder and moving the media on/off the transcoder. To move the SIP processing off of the transcoder, it may send a SIP-Reinvite to a first endpoint (e.g., 106a). In the Reinvite is the ip address and port that at least a second endpoint (e.g., 106N) gave the transcoder to send media to. The first endpoint 106a then replies with a 200ok message, which contains the ip address/port to which the transcoder is to send media. In turn, the transcoder may send a SIP-Reinvite to the second endpoint 106N with this ip address/port, and the second endpoint 106N may return a 200ok message in response. Having exchanged the foregoing messages, the endpoint 106a is sending media directly to the endpoint 106N, and vice-versa.

To get the media stream back, the transcoder module may send a SIP-Reinvite to the endpoint 106a. This SIP-Reinvite may include the ip address/port on the transcoder to which the endpoint 106a is to send media. In response, the endpoint 106a sends a 200ok message that indicates the address/port on the endpoint to which the transcoder is to sends media. The transcoder then sends a SIP-Reinvite to the endpoint 106n, with the Reinvite including an ip address/port of the transcoder to which the endpoint 106n is to send media. In turn, the endpoint 106N may return a 200ok message with its ip address/port, to which the transcoder is to send media. Then, the endpoint 106N may send media to the transcoder, and in turn, the transcoder may send that media to the endpoint 106a, and vice-versa.

If the transcoder module is to drop the transcoding server or transcoder out of both media and signaling, the transcoder module may do so by transferring the call from one party (e.g., 106a or 106n) from the transcoder to the other party. One approach may include sending a SIP Refer message to the endpoint 106a, asking it to send an Invite to the endpoint 106n specifying that this new call is to replace the call between the endpoint 106N and the transcoder. The SIP dialog and the media stream would then flow between the endpoints 106a and 106n.

Having dropped the transcoder from the signaling path, either of the endpoints 106a or 106n may request to have the transcoder put back into the signaling path. For example, if the endpoint 106a makes the request, this endpoint may send a SIP-invite to the transcoder, asking it to send a SIP-invite specifying that new calls between the transcoder and the endpoints are to replace the call directly between the endpoints 106a and 106n.

It is noted that blocks 320-334 may be performed repeated an arbitrary number of times over the time axis 302, at various instances of times 304. For example, the processes 300 may perform one or more of these blocks 320-334 at the time 304n, taking into account any changes in condition that occurred over the interval between the times 304b and 304n. FIG. 3 denotes such changes at block 336.

Figure 4:
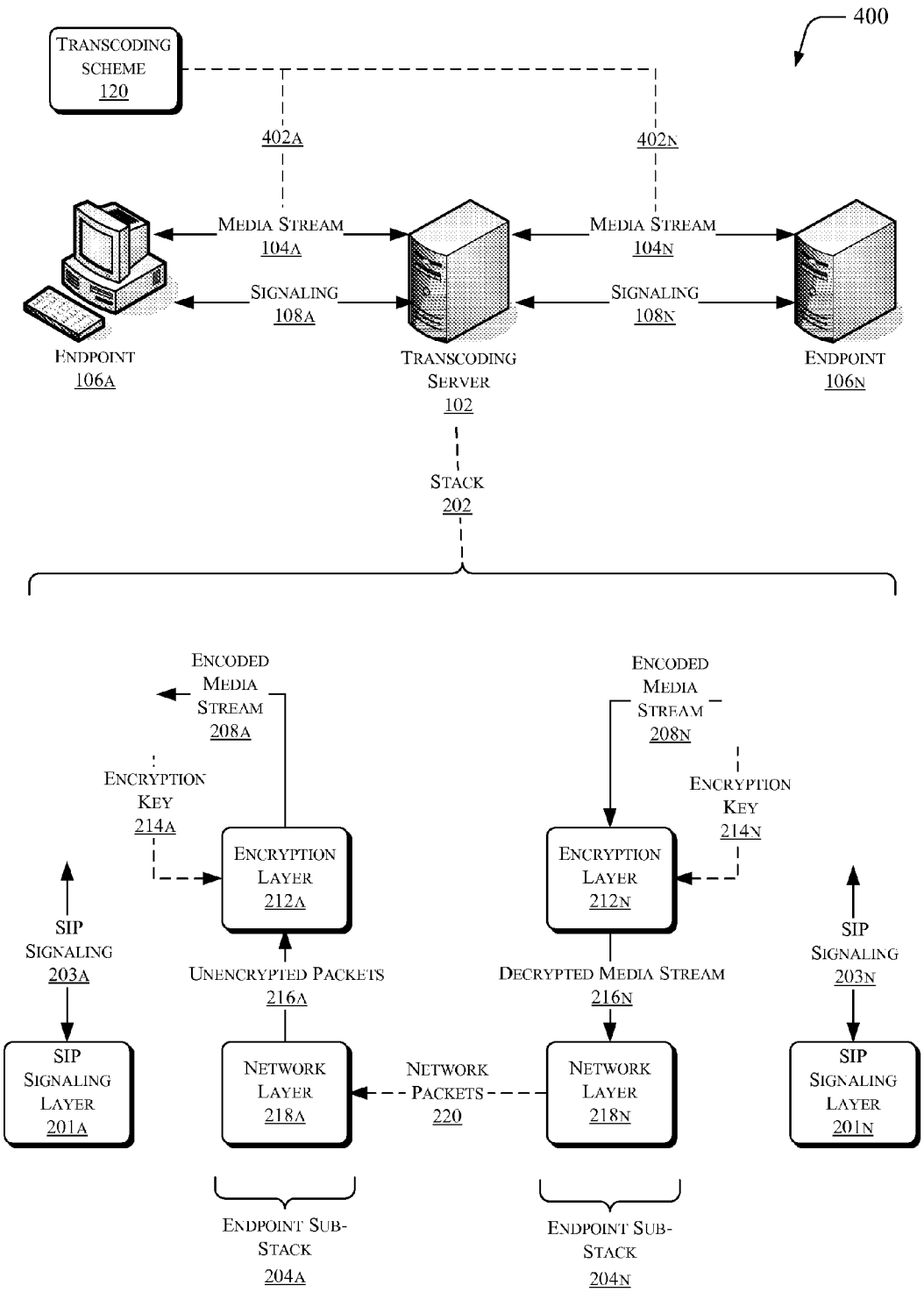
FIG. 4 is a block diagram indicating how the stack structures may change if the transcoding server drops out from handling a media stream as part of dynamically transcoding the media streams.

Having described the processes for dynamically transcoding media streams as the streams are transmitted over time in FIG. 3, the discussion now turns to a description of how the stack structures may change if the transcoding server drops out from transcoding a media stream, now presented with FIG. 4.

FIG. 4 illustrates scenarios 400 indicating how the stack structures may change if the transcoding server drops out from transcoding a media stream. For convenience of description, but not to limit possible implementations, some items described previously may be carried forward into FIG. 4 and denoted by similar reference signs.

In the example shown in FIG. 4, the transcoding server (e.g., 102) drops out from transcoding the media stream 104, such that the endpoints 106*a* and 106*n* transmit the media stream to one another, without the server transcoding between the endpoints. Thus, the server may employ a common encoding scheme for the media streams 104*a* and 104*n*, as indicated by the dashed lines 402*a* and 402*n*. However, in FIG. 4, the server maintains the signaling flows 108*a* and 108*n* between the endpoints 106, as well as encrypting packets as exchanged between the endpoints.

As described above, the server may off-load the media stream to the endpoints when the endpoints are able to use the same codecs. In this scenario, the server would not transcode the media streams. Thus, referring to the stack 202 as shown in FIG. 4, the sub-stacks 204*a* and 204*n* for the endpoints may omit the encoding layer components 206*a* and 206*n*. In the FIG. 4 scenario, the server may transfer the encryption keys 214*a* and 214*n* to the endpoints, so that the endpoints may encrypt the media streams themselves. Referring to the endpoint sub-stack 204*n*, the encryption layer component 212*n* may, for example, receive and decrypt the encoded media stream 208*n* directly, without the stream first passing through an intermediate decoding layer (e.g., 206*n* in FIG. 2).

Referring to the endpoint sub-stack 204*a*, the encryption layer component 212*a* may encrypt the outgoing packets 216*a* directly into the encoded media stream 208*a*. In the FIG. 4 scenario, the media stream as transmitted between the endpoints maintains the same encoding as it flows through the stack 202 and related sub-stacks 204*a* and 204*n* as maintained by the server 102.

FIG. 4 shows an example in which the server 102 no longer transcodes, but continues to encrypt between the endpoints. However, implementations are also possible in which the server 102 offloads all processing associated with handling the media streams 104. In these implementations, the media streams 104 would entirely bypass the server 102, with the media stack structures 204*a* and 204*n* being torn down on the server. If the server retains the signal processing, the signaling layer components 201*a* and 201*n* and related signaling 203*a* and 203*n* may remain on the server.

Figure 5:
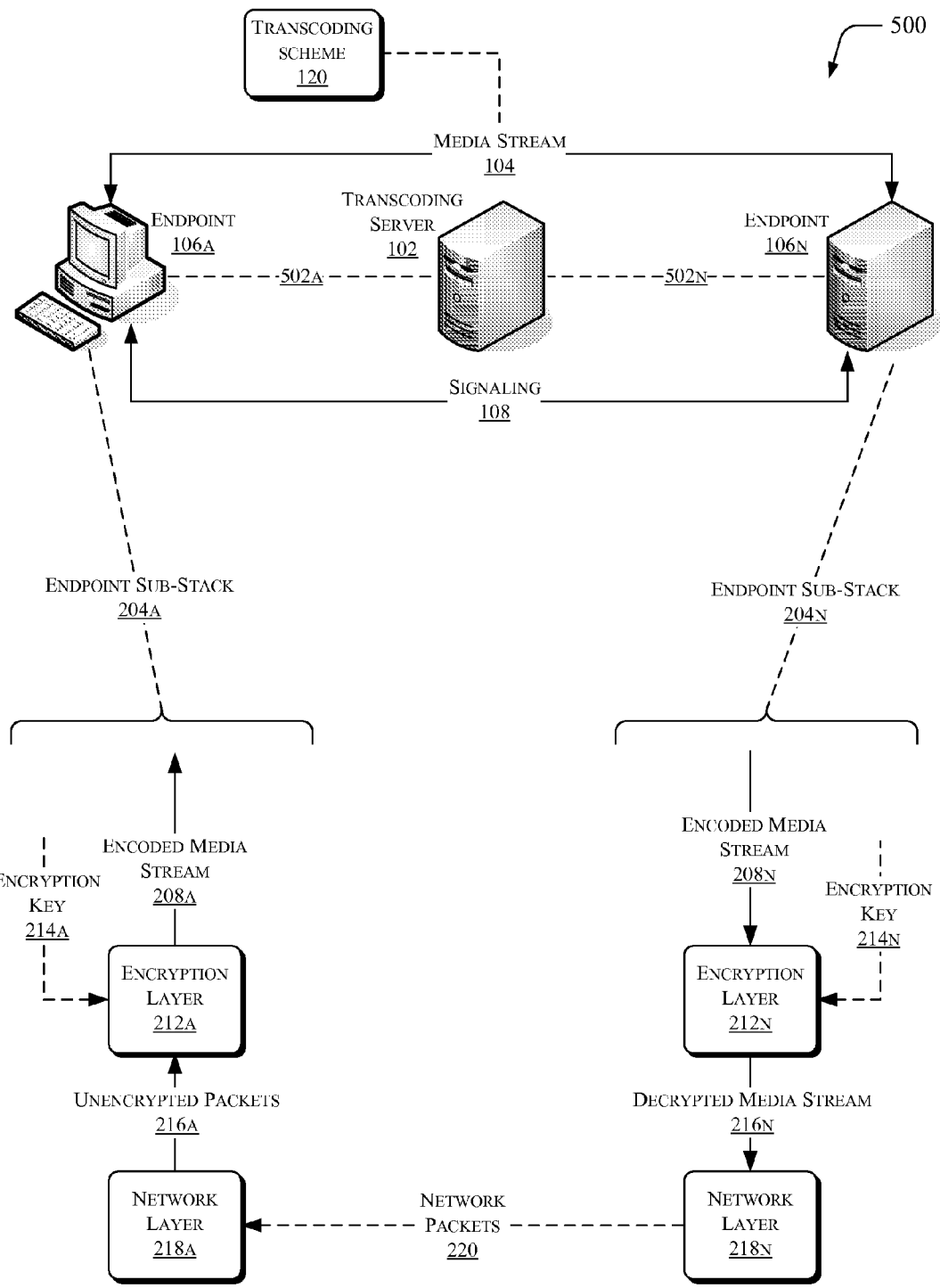
FIG. 5 is a block diagram indicating how the stack structures may change if the transcoding server drops out from handling signal flows as part of dynamically transcoding the media streams.

FIG. 5 illustrates scenarios, denoted generally at 500, indicating how the stack structures may change if the transcoding server drops out from handling signal flows as part of dynamically transcoding the media streams. For convenience of description, but not to limit possible implementations, some items described previously may be carried forward into FIG. 5 and denoted by similar reference signs.

In the scenario shown in FIG. 5, the media stream 104 and the signaling flow 108 both bypass the transcoding server, with the endpoints 106*a* and 106*n* handing these flows directly. Thus, the endpoints 106*a* and 106*n*, respectively, may maintain the sub-stack 204*a* and the sub-stack 204*n*, with the server playing a minimal role in handling the media streams. However, as represented by the dashed lines 502*a* and 502*n* (collectively, communication links 502), the server 102 may maintain communication links with the endpoints. If changing conditions warrant rerouting the media stream and/or the signal flow back through the server, the endpoints and the server may exchange signals over the communication links to effect this rerouting. For example, the endpoints and the server may exchange a sequence of SIP-compliant messages to bring the server back into handling the media streams and/or the signal flows.

Figure 6:
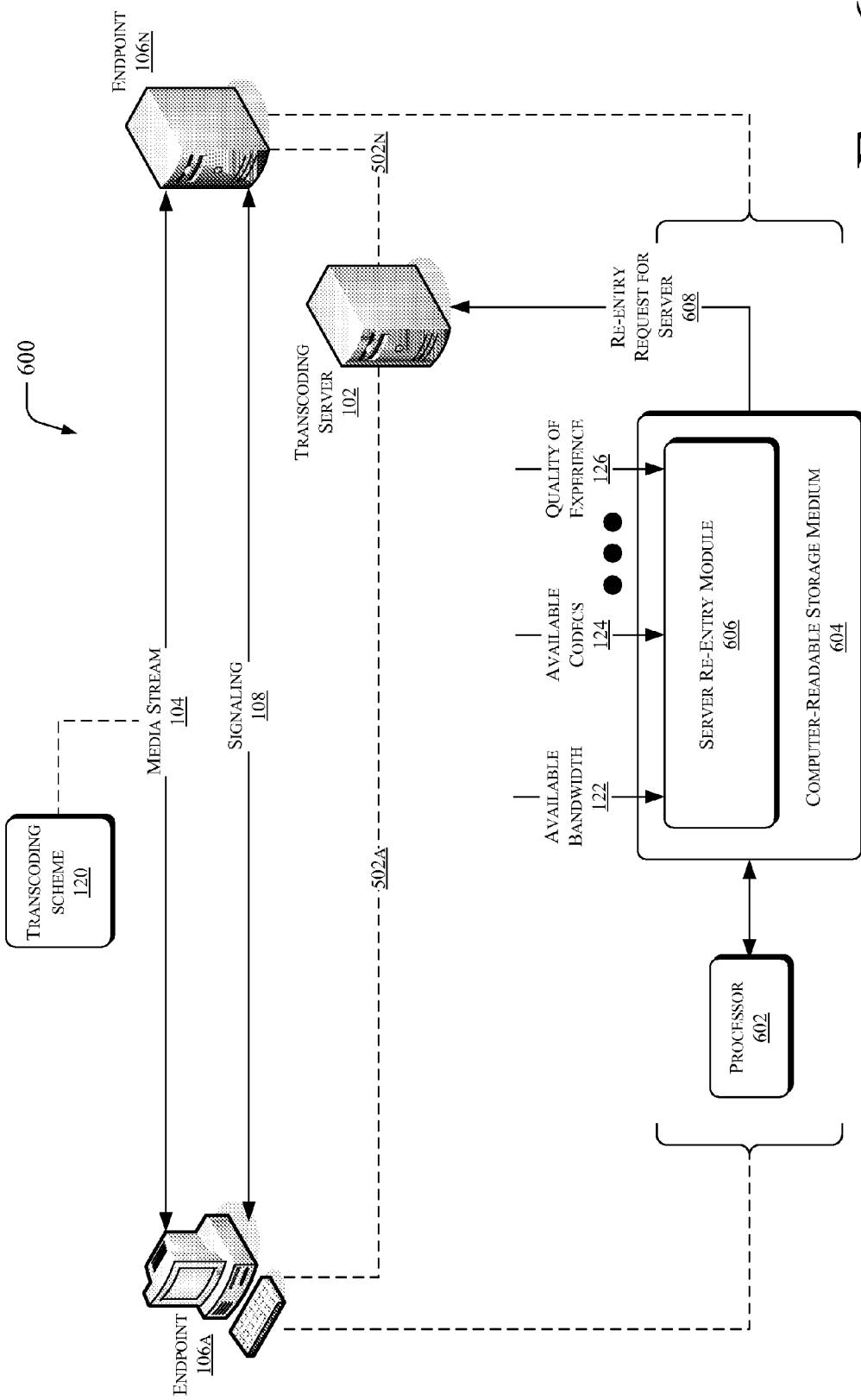
FIG. 6 is a block diagram of components and modules related to bringing the transcoding server back into handling signal flows.

FIG. 6 illustrates, generally at 600, components and modules related to bringing the transcoding server back into handling signal flows. For convenience of description, but not to limit possible implementations, some items described previously may be carried forward into FIG. 6 and denoted by similar reference signs.

In the scenario shown in FIG. 6, the endpoints 106 may include respective instances of processors 602, with the above description of the processor 110 applying equally to the processors 602. The endpoints may also include respective instances of computer-readable storage media 604, with the above description of the computer-readable storage media 112 applying equally to the computer-readable storage media 604.

The computer-readable storage media 604 may include a server reentry module 606 that includes software instructions for analyzing a variety of input parameters, and determining when changing conditions may warrant requesting the server 102 to resume handling the media stream 104 and/or the signaling flow 108. FIG. 6 carries forward examples of input parameter at 122 (network bandwidth available for various endpoints), 124 (codecs supported by various endpoints), and 126 (QoE parameter gathered over some period of time). The module 606 may also consider and analyze other input parameters, as discussed above with the module 116 shown in FIG. 1. Additionally, FIG. 3 provides examples of changing or changed conditions at 316 and 336.

If analysis of the input condition parameters (e.g., 122, 124, 126, and/or other parameters) indicates that conditions warrant requesting the server 102 to resume handling the media stream 104 and/or the signaling flow 108, then the module 606 may generate a signal 608 requesting reentry by the server. This signal may be routed to the server 102, as shown in FIG. 6. In turn, the server may communicate with the endpoints via the links 502*a* and 502*n* to negotiate reentry by the server.

Figure 7:
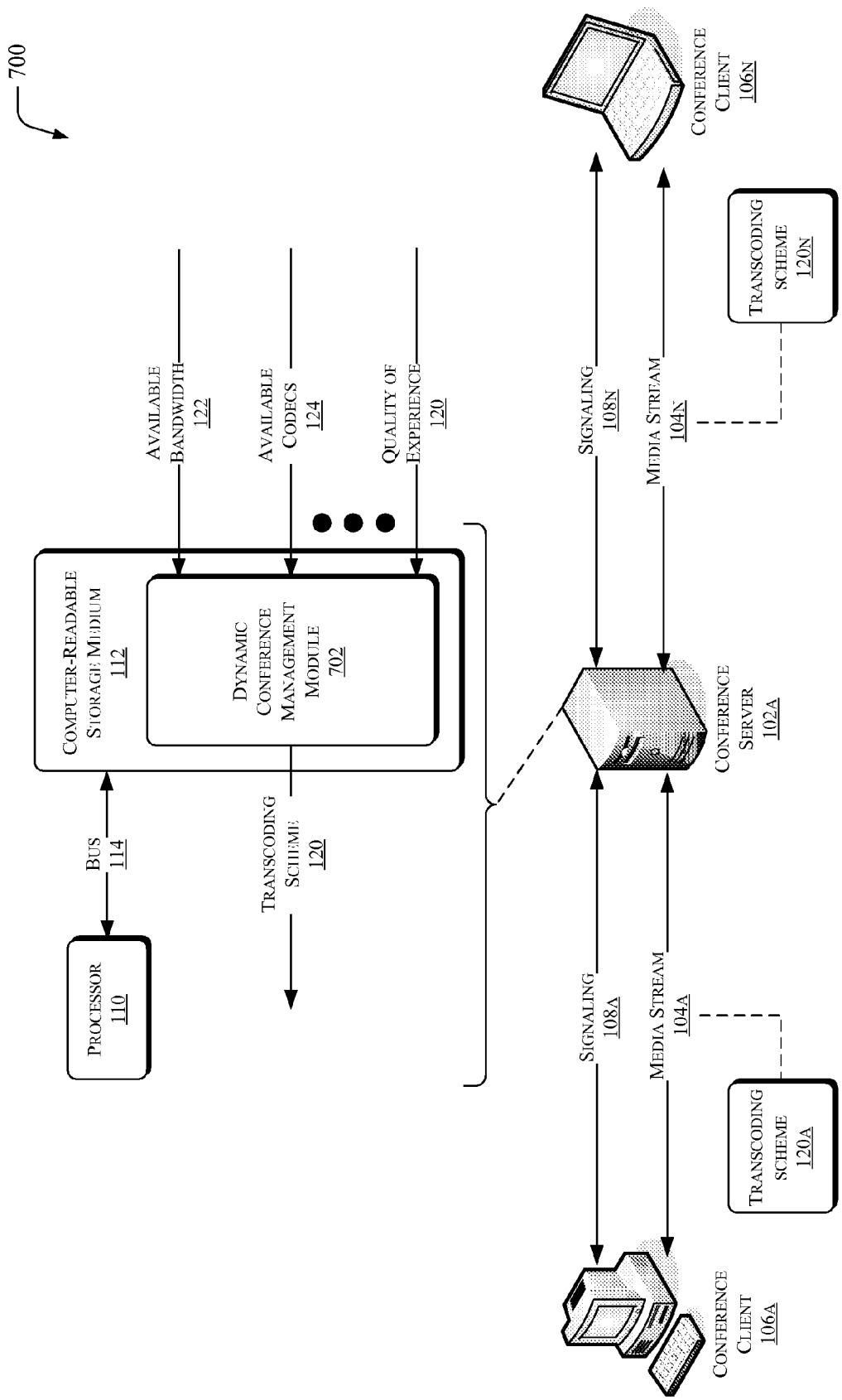
FIG. 7 is a block diagram of operating environments and/or systems that apply the foregoing techniques for dynamically transcoding media streams in a conferencing context.

FIG. 7 illustrates operating environments or systems 700 that apply the foregoing techniques for dynamically transcoding media streams in a conferencing context. For convenience of description, but not to limit possible implementations, some items described previously may be carried forward into FIG. 7 and denoted by similar reference signs.

The transcoding server 102 is carried forward into FIG. 7, and is denoted as a conferencing server 102*a*. FIG. 7 also carries forward the processor 110, the bus 114, and the medium 112 for ease of description, but not to limit implementations. The medium 112 may include a dynamic conference management module 702, which in turn may include one or more programs of instructions that apply the above techniques to optimize dynamically the transcoding between, for example, media streams 104*a* and 104*n*. However, in the examples shown in FIG. 7, these media streams may represent media transmitted among and between conferees. Thus, FIG. 7 carries forward the endpoints 106*a* and 106*n* for convenience, but FIG. 7 denotes these items as conference clients, as particular examples of endpoints that participate in conferences managed and facilitated by the conference server 102*a*.

The signaling 108*a* and 108*n* generally represent commands, messages, and/or requests related to managing these conferences. Examples of such commands may pertain to admitting conferees, deleting conferees, creating conferences, terminating conferences, issuing commands during the conferences, and the like.

As part of managing the conferences, the conference server 102*a* may select a transcoding scheme 120, based on similar input parameters as those discussed above in FIG. 1. Thus, without excluding or limiting possible implementations, FIG. 7 carries forward examples of such input parameters at 122, 124, and 126. Based on analysis of these parameters, the conference server may select the transcoding scheme 120, which, in turn, may specify a transcoding 120a for the conference client 106a, and a transcoding 120n for the conference client 106n.

To define the transcoding scheme 120, the conference server may advertise to the conference client which codecs the conference server supports. As described above, one goal of the transcoding process is to have as many endpoints or conference clients as possible to use the same codecs. In these circumstances, if two or more endpoints use the same codec, then the conference server may drop the transcoding function as performed between these endpoints. Thus, as part of the process for negotiating the transcoding scheme, the conference server may selectively advertise which codecs it supports. In this manner, the conference server, or more specifically, the dynamic conference management module 702, may at least attempt to influence the codecs used by the conference clients.

As an example, if a given codec offers high bandwidth capacity or potential, then the conference server may advertise this codec first to the conference clients, in the hopes that as many conference clients as possible support this codec and can agree to use it. If some conference clients cannot use this codec, then the conference server may negotiate another codec with these clients, and may transcode between this second codec and the first codec as appropriate.

The conference server may continually sample network and/or conference conditions over time, and may update the transcoding scheme to optimize bandwidth and QoE as the conference progresses. For example, if some conference clients cannot use the high-bandwidth codec for any reason at the outset of a conference, conditions may change later that permit these conference clients to use this codec. If these conditions so change, the conference server may detect these changes and may update the transcoding scheme 120 dynamically in response to those changes. In a conferencing context as shown in FIG. 7, the conference server may dynamically update the transcoding schemes 120a and 120n to optimize the conferencing experience for the various conference clients 106a and 106n.

CONCLUSION

Although the systems and methods have been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain data and process flow diagrams described and illustrated herein, it is noted that the processes and sub-processes depicted therein may be performed in orders other than those illustrated without departing from the spirit and scope of the description herein. Also, while these data and process flows are described in connection with certain components herein, it is noted that these data and process flows could be performed with other components without departing from the spirit and scope of the description herein.

The invention claimed is:

1. A transcoding server comprising:
a processor;
memory; and
a dynamic encoding module, maintained on the memory and executable by the processor, for:
defining at least one initial transcoding scheme under which at least one media stream is to be transcoded as it passes between at least two endpoints, wherein the defining includes negotiating an initial transcoding scheme with at least two endpoints including selecting an initial transcoding scheme where a minimum number of codecs are selected; and
dynamically updating the initial transcoding scheme in response to a change in at least one condition affecting the media streams, the updating comprising re-negotiating a transcoding scheme comprising:
determining at least one codec that is supported by at least one of the at least two endpoints;
analyzing bandwidth availability and bandwidth usage related to codecs supported by the at least one endpoint;
reducing a total number of codecs to be used in the transcoding scheme by selection of the at least one codec for use with the at least one endpoint;
dropping the media stream in response to the change in the at least one condition; and
reacquiring the media stream in response to a further change in the at least one condition.

2. A conferencing server including a machine-readable storage medium comprising machine-readable instructions that, when executed by the machine, cause the machine to perform a method comprising:
defining at least one initial transcoding scheme under which at least one media stream is to be transcoded as it passes between at least two endpoints, wherein the defining includes negotiating an initial transcoding scheme with at least two endpoints including selecting an initial transcoding scheme where a minimum number of codecs are selected, the defining includes:
advertising a codec to the at least two endpoints; and
determining at least one codec that is supported by at least one endpoint; and
dynamically updating the initial transcoding scheme in response to a change in at least one condition affecting the media streams, the change in the at least one condition comprising a fixed value of a condition being determined, the value of the condition being estimated at the defining of the at least one initial transcoding scheme, the updating comprising re-negotiating a transcoding scheme comprising:
determining at least one codec that is supported by at least one of the at least two endpoints;
analyzing bandwidth availability and bandwidth usage related to codecs supported by the at least one endpoint;
reducing a total number of codecs to be used in the transcoding scheme by selection of the at least one codec for use with the at least one endpoint;
dropping the media stream in response to the change in the at least one condition; and
reacquiring the media stream in response to a further change in the at least one condition.

3. The conferencing server of claim 2, wherein the defining includes:
influencing codecs used by the at least one endpoint by selectively advertising codecs supported by the conferencing server.

4. At least one machine-readable storage medium comprising machine-readable instructions that, when executed by the machine, cause the machine to perform a method comprising:
defining at least one initial transcoding scheme under which at least one media stream is to be transcoded as it passes between at least two endpoints, wherein the defining includes negotiating an initial transcoding scheme with at least two endpoints including selecting an initial transcoding scheme where a minimum number of codecs are selected; and dynamically updating the initial transcoding scheme in response to a change in at least one condition affecting the media streams, the updating comprising re-negotiating a transcoding scheme comprising:

determining at least one codec that is supported by at least one of the at least two endpoints;

analyzing bandwidth availability and bandwidth usage related to codecs supported by the at least one endpoint;

reducing a total number of codecs to be used in the transcoding scheme by selection of the at least one codec for use with the at least one endpoint;

dropping the media stream in response to the change in the at least one condition; and reacquiring the media stream in response to a further change in the at least one condition.

5. The machine-readable storage medium of claim 4, wherein the updating the initial transcoding scheme further comprises determining a change in the at least one condition by determining a fixed value of a condition affecting the at least one media stream as the at least one media stream passes between the at least two endpoints.

6. The machine-readable storage medium of claim 4, further comprising instructions for initiating transmission of the at least one media stream under the initial transcoding scheme.

7. The machine-readable storage medium of claim 4, further comprising instructions for sampling at least one value for at least one metric related to transmitting the at least one media stream, after initiating transmission of the media stream, and wherein the instructions for dynamically updating the initial transcoding scheme include instructions for updating the transcoding scheme in response to the sampled value.

8. The machine-readable storage medium of claim 4, further comprising instructions for sampling respective bandwidth parameters available to the at least two endpoints, and wherein the instructions for dynamically updating the initial transcoding scheme include instructions for updating the transcoding scheme in response to the bandwidth parameters.

9. The machine-readable storage medium of claim 8, further comprising instructions for re-sampling the respective bandwidth parameters over time as the at least one media stream passes between the at least two endpoints.

10. The machine-readable storage medium of claim 4, further comprising instructions for sampling respective quality of experience (QoE) parameters associated with the at least two endpoints, and wherein the instructions for dynamically updating the initial transcoding scheme include instructions for updating the transcoding scheme in response to the QoE parameters.

11. The machine-readable storage medium of claim 10, further comprising instructions for re-sampling the respective QoE parameters over time as the at least one media stream passes between the at least two endpoints.

12. The machine-readable storage medium of claim 4, wherein the instructions for dynamically updating the initial transcoding scheme include instructions for updating a codec used to encode the at least one media stream passed between the at least two endpoints.

13. The machine-readable storage medium of claim 4, wherein the instructions for dynamically updating the initial transcoding scheme include instructions for selecting a single codec used to encode the at least one media stream passed between the at least two endpoints.

14. The machine-readable storage medium of claim 5, wherein the dropping the media stream comprises dropping a transcoding server from handling the at least one media stream.

15. The machine-readable storage medium of claim 14, wherein the reacquiring the media stream comprises returning the media stream to the transcoding server.

16. The machine-readable storage medium of claim 5, further comprising instructions for dropping a transcoding server from handling signal flows in response to the change in the at least one condition.

17. The machine-readable storage medium of claim 16, further comprising instructions for returning the signal flows to the transcoding server in response to at least a further change in a condition affecting the at least one media stream.

18. The machine-readable storage medium of claim 4, wherein the at least one media stream includes streams related to a conference.

19. The machine-readable storage medium of claim 5, wherein the at least one initial transcoding scheme is based at least in part on an estimate of the fixed value of the condition at the defining of the initial transcoding scheme.

20. The machine-readable storage medium of claim 19, wherein the condition comprises at least one of bandwidth availability, bandwidth usage, or QoE parameters associated with the at least two endpoints.

* * * * *